(12) United States Patent
Ninnemann et al.

(10) Patent No.: US 11,319,258 B2
(45) Date of Patent: May 3, 2022

(54) INVENTION RELATES TO A METHOD FOR PRODUCING AN ORGANIC FERTILIZER WITH HUMIC PROPERTIES

(71) Applicant: Novihum Technologies GmbH, Dresden (DE)

(72) Inventors: Horst Ninnemann, Dortmund (DE); Reinhard Sorge, Roitzsch (DE); Peter Langer, Hasbergen (DE)

(73) Assignee: Novihum Technologies GmbH, Dresden (DE)

( * ) Notice: Subject to any disclaimer, the term of this patent is extended or adjusted under 35 U.S.C. 154(b) by 228 days.

(21) Appl. No.: 16/092,352

(22) PCT Filed: Apr. 27, 2017

(86) PCT No.: PCT/EP2017/060060
§ 371 (c)(1),
(2) Date: Oct. 9, 2018

(87) PCT Pub. No.: WO2017/186852
PCT Pub. Date: Nov. 2, 2017

(65) Prior Publication Data
US 2019/0144351 A1  May 16, 2019

(30) Foreign Application Priority Data
Apr. 28, 2016 (EP) .................... 16167503

(51) Int. Cl.
| C05F 11/02 | (2006.01) |
| C05G 3/00 | (2020.01) |
| C05F 17/971 | (2020.01) |
| C05C 3/00 | (2006.01) |
| C05F 11/08 | (2006.01) |

(52) U.S. Cl.
CPC ............... *C05F 11/02* (2013.01); *C05C 3/00* (2013.01); *C05F 11/08* (2013.01); *C05F 17/971* (2020.01); *C05G 3/00* (2013.01)

(58) Field of Classification Search
CPC ...... C05F 11/02; C05F 17/929; C05F 17/957; C05F 17/971; C05F 11/08; C05C 3/00; B01F 2003/04872; B01F 2003/04879; B01F 2003/04886; B01F 5/10; B01F 5/102; B01F 5/104; B01F 5/106; B01F 5/108; C05G 3/00; Y02W 30/40; Y02P 20/145

See application file for complete search history.

(56) References Cited

U.S. PATENT DOCUMENTS

| 6,695,892 B1 * | 2/2004 | Fischer ................... C05F 11/02 71/24 |
| 2012/0227315 A1 * | 9/2012 | Taylor ....................... C10L 9/08 44/280 |
| 2012/0247164 A1 * | 10/2012 | Dahms ...................... C05C 3/00 71/8 |

FOREIGN PATENT DOCUMENTS

| DE | 859 742 C | 12/1952 |
| DE | 870 565 C | 3/1953 |
| DE | 2 247 938 A1 | 4/1974 |
| WO | 00/37394 A1 | 6/2000 |

OTHER PUBLICATIONS

Mitchell, Reginald E., Paul A. Campbell, and Liqiang Ma. "Characterization of coal and biomass conversion behaviors in advanced energy systems." GCEP Technical Report. 2006. 1-13. (Year: 2006).*
EcoCA. "Atmospheric Pressure" Weather. <http://www.ecoca.ro/meteo/tutorial/Weather/Older/Pressure.html> Jul. 23, 2015 (Year: 2015).*
International Search Report and Written Opinion issued in Int'l Application No. PCT/EP2017/060060 filed on Apr. 27, 2017, pp. 1-16 (Jun. 7, 2017).

* cited by examiner

*Primary Examiner* — Jennifer A Smith

(74) *Attorney, Agent, or Firm* — Phan Law Group PLLC

(57) ABSTRACT

The present invention relates to a method for producing an organic fertilizer with humic substance properties by oxidizing and ammonifying lignite, wherein the organic fertilizer has a nitrogen content of up to 8 wt. %, based on the dry weight of the fertilizer, and a C/N ratio of 7 to 15, which is characterized in that the method is carried out as a continuous method and comprises the following steps: a) dispersing the lignite and aqueous ammonia solution in a dispersing circuit having a dispersing device, a recirculation container, and a recirculation pump; b) oxidizing the suspension from step a) with an oxygen-containing oxidizing agent at a temperature of <100° C. in an oxidation reactor; c) drying the product suspension obtained in step b) at a temperature of >50° C.; and d) cooling the dried product obtained in step c).

18 Claims, No Drawings

INVENTION RELATES TO A METHOD FOR PRODUCING AN ORGANIC FERTILIZER WITH HUMIC PROPERTIES

PRIORITY CLAIM

This is a national stage application of Intl Application No. PCT/EP2017/060060 filed on 27 Apr. 2017, which claims priority to European Patent Application No. 16167503.8 filed on 28 Apr. 2016. The specifications of both applications are hereby incorporated by reference in their entirety.

FIELD OF THE INVENTION

The present invention relates to a method for producing an organic fertilizer with humic substance properties.

BACKGROUND OF THE INVENTION

Already for a long time lignite has found to be of interest as a starting material for producing substances or mixtures of substances, respectively with fertilizing effect due to its chemical properties and availability.

EP 1 144 342 discloses a method for producing an organic fertilizer with humic substance properties by oxidizing and ammonifying lignite that is characterized in that lignite is converted to an aqueous-ammoniac mixture of suspension and solution having a pH greater than 9 to 12 and subsequently alkaline-activated in a reactor first without supply of oxygen or air and thereby brought to an oxidation temperature below 100° C. in a time period that can be controlled up to 0.5 hrs, subsequently the oxidation gas at a reaction temperature below 100° C. and in the case of air the oxygen as oxidation gas under standard pressure and in the case of air/oxygen mixtures as oxidation gas at standard pressure with an oxygen partial pressure in a range from 0.02 MPa to <0.1 MPa is fed into the reaction mixture each in accordance with the injector principle, and subsequently the supply of oxidation gas is stopped and the reaction is arrested and the reaction mixture is cooled without any further supply of oxidation gas to a temperature that is required for further processing, wherein the cooling time is less than 1 h, and the organic fertilizer is recovered as a dispersion in the aqueous milieu by thickening or drying, wherein a C/N ratio of 9 to 15 is obtained.

However, a drawback of the method of EP 1 144 342 is that the alkaline activation of the lignite with the aqueous ammonia solution and the subsequent oxidation are carried out in the same reaction vessel, the above-described reactor. This requires that the aqueous-ammoniac lignite mixture first is brought to a temperature suitable for the oxidation reaction within a certain time, and after completion of the oxidation is cooled again in order to enable the further processing. Here, the supply of the oxidation gas is interrupted and thus, the reaction arrested.

Studies of the inventors on the optimization of the method have shown that a continuous process realization in which the starting materials lignite and aqueous ammonia solution are continuously fed into the method and the reaction does not have to be interrupted is not readily possible with the method described in EP 1 144 342. A continuous process realization would be of advantage in that the product could be prepared at a high throughput of the starting materials and low energy demand.

Moreover, the method of EP 1 144 342 has the drawback that the product properties can be modified to a limited extent only. For example, the product characteristics are also affected by the efficiency of the oxidation reaction that in turn is affected by the mean particle size of the lignite used. Particularly small lignite particles have a larger surface and thus, increase the point of attack for the oxidation reaction. In EP 1 144 342 lignite particles of <0.4 mm in size are employed. This includes a wide range of different sizes. Further reduction in size of the lignite particles does not take place during the method of EP 1 144 342.

The use of mean particle sizes in the range of ≤10 μm with a relatively uniform particle size distribution would be of advantage to enhance the efficiency of the oxidation reaction and allow an easier adjustment of the proportions of differently hydrolysable forms of nitrogen bonds in the product. However, to obtain such particle sizes commercially available lignite generally has to be reduced in size. Regarding this, it would be of advantage if such a reduction in size could be performed during a continuous method for producing an organic fertilizer with humic substance properties by oxidizing and ammonifying lignite. This is not readily possible with the method of EP 1 144 342.

SUMMARY OF THE INVENTION

Accordingly, it is the task of the present invention to provide an efficient method for producing an organic fertilizer with humic substance properties by oxidizing and ammonifying lignite, wherein the method enables a high throughput of starting materials at low energy demand as well as a selective affection of the product characteristics.

According to the invention this problem is solved by a method for producing an organic fertilizer with humic substance properties by oxidizing and ammonifying lignite, wherein the organic fertilizer has a nitrogen content of up to 8 wt. %, based on the dry weight of the fertilizer, and a C/N ratio of 7 to 15, wherein the method is characterized in that it is carried out as a continuous method and comprises the following steps:

a) feeding lignite particles and aqueous ammonia solution as well as optionally recovered product of step b) as starting materials into a dispersing circuit having a dispersing device, a recirculation container, and a recirculation pump, and dispersing the starting materials while simultaneously reducing the lignite particles in size until a suspension of lignite particles and aqueous ammonia solution is formed that is taken out of the dispersing circuit and transferred to step b);

b) oxidizing the suspension obtained in step a) in an oxidation reactor with an oxygen-containing oxidizing agent at a temperature of <100° C., thereby forming a product suspension that is completely transferred to step c) or partially to step c) and partially to step a) as the starting material;

c) drying the product suspension obtained in step b) at a temperature of >50° C. up to a residual moisture content of at most 30 wt. %, based on the total weight of the dried product;

d) cooling the dried product obtained in step c).

DETAILED DESCRIPTION OF THE INVENTION

In the description of the present invention step a) can also be referred to as "dispersing step", step b) can also be referred to as "oxidation step", step c) can also be referred to as "drying step", and step d) can also be referred to as "cooling step".

The advantage of the method according to the invention over the method of EP 1 144 342 is that the process at no point must be interrupted, but can be carried out in the continuous production operation over 24 hrs a day what enables a high throughput of the starting materials at low energy demand and thus, is of advantage for execution on an industrial scale. Moreover, in each step it is possible to directly influence the product characteristics, i.e. the nitrogen binding ratios, for example by reducing the lignite particles in size during the dispersing step a) that affects and favors the oxidation reaction in step b) and thus, in the end determines the nitrogen binding ratios in the product; or by adjusting temperature and duration of drying in step c); or by being able to add further gases, such as for example $CO_2$, in each individual process step. Finally, the process realization can be such that the oxidation of the lignite particles already starts with the first process step and continues until the product is cooled in step d) which also is economically advantageous. Finally, the method according to the invention enables to easily scale the product throughput, which is not possible in this way with the method of the prior art.

The term "humic substance properties" is a technical term that is known to the skilled person. According to the wording this shall mean that a product has the properties of humic substances. Humic substances are fulvic acids, the hymatomelanic acids, the humic acids, and the humins (Fiedler, H. J. and Reissig, H.: "Lehrbuch der Bodenkunde", Gustav Fischer Verlag Jena, 1964, p. 174, pt. 4.423). In a preferred embodiment of the invention the term "humic substance properties" has to be understood such that the mentioned organic fertilizer is largely composed of humic substances. Here, largely with respect to the proportion of humic substances means that the humic substances constitute the largest part by weight of the organic fertilizer prepared in accordance with the invention based on the dry weight of the fertilizer. For example, this is supposed to mean that the humic substances constitute >50 wt. %, preferably >60 wt. %, more preferably >70 wt. %., and particularly preferred >80 wt. %, of the organic fertilizer prepared in accordance with the invention based on the dry weight of the fertilizer.

Also, an "oxidizing and ammonifying treatment" is known to the skilled person. This is done by the method described here. An "oxidizing and ammonifying treatment" often is also referred to as "oxidative ammonolysis". Oxidative ammonolysis has already been described by Flaig, et.al. (1959), for example in "Umwandlung von Lignin in Huminsäuren bei der Verrottung von Weizenstroh" Chem.Ber.,92 8, 1973-1982.

The term "continuous method" within the context of the invention described here has to be understood such that starting materials that in the present case particularly are lignite and aqueous ammonia solution as well as optionally recovered product of step b), are continuously fed to the method and converted to dried and cooled product via the steps a) to d) without the need to interrupt the method or the process steps to form the product and to withdraw it from the process.

The term "dispersing circuit", as used herein, indicates an arrangement comprising a dispersing device, a recirculation container, and a recirculation pump. This also encompasses that the dispersing device and the recirculation pump are disposed in an aggregate.

Here, as much starting materials are continuously fed into the dispersing circuit in process step a) as suspension product is taken out and fed to step b), so that the substance volume in the dispersing circuit remains substantially constant. Also, as much of the suspension obtained in step a) is continuously fed into the oxidation reactor in step b) as oxidized product suspension is taken out and completely fed to step c) or partially to step c) and partially to step a) as starting material.

The term "suspension" or "lignite suspension", as used herein, indicates a suspension of lignite particles and aqueous ammonia solution, that, as described herein, is obtained by dispersing or blending lignite particles and aqueous ammonia solution as well as optionally recovered product of step b) in the dispersing device. The term "suspension", as used herein, also encompasses that a part of the lignite dissolves, i.e. the suspension described herein is a mixture of lignite suspension and lignite solution in aqueous ammonia. The mixture represents a colloid-disperse system.

The term "mean retention time", as used within the context of the description of the method according to the invention, indicates a period of time in which a certain result is achieved, for example formation of the suspension in step a) or oxidation of the suspension in step b), drying of the oxidation product in step c), cooling of the dried product in step d) or formation of the final process product starting with the preparation of the suspension of lignite particles and aqueous ammonia solution in step a) until obtaining the cooled product in step d). In the context of the method according to the invention the term does not suggest that there is an interruption of the method or a process step after or within such a period.

The abbreviation "wt. %", as used herein, represents "percentage by weight" and indicates the weight of a proportion based on a total weight. What the proportion is and on which total weight this is based is respectively specified at the appropriate site within the context of the present description of the invention.

The cooled product obtained in step d) is a "fertilizer with humic substance properties". A fertilizer with humic substance properties in the context of the present invention is a substance or mixture of substances with a fertilizing effect for plants and soil that has a nitrogen content of up to 8 wt. %, based on the dry weight of the fertilizer, and a C/N ratio of 7 to 15.

The aqueous ammonia solution used in step a) is obtained by dissolving ammonia in water. The aqueous ammonia solution or its starting materials water and ammonia, respectively may also be recovered from the reaction process, in particular from step b) and step c), and made available to the method again what contributes to the economic efficiency of the method.

The aqueous ammonia solution preferably has a concentration of up to 10 wt. %, wherein the concentration preferably is at least 2 wt. %, each based on the total weight of the aqueous ammonia solution. A concentration of 3 to 8 wt. % is more preferable, and especially preferred is a concentration of 4 to 6 wt. %, each based on the total weight of the aqueous ammonia solution.

The pH value of the aqueous ammonia solution is preferably between 9 and 12.

The present method enables the use of lignite particles as a starting product the size of which does not play a decisive role since the lignite particles are reduced in size during the method. For practical reasons lignite particles of mean particle sizes of >10 μm are preferably employed in the context of the method according to the invention, wherein lignite particles of particle sizes of e.g. up to 10 mm can also be employed. Lignite particles of particle sizes up to 5 mm are more preferred, more preferably up to 2 mm, more preferably up to 1 mm, more preferably up to 500 μm, especially preferred up to 100 µm. The lignite particles are preferably lignite dust of typical mean particle sizes in the range of >10 to 600 µm, especially in the range of 200 to 300 µm, i.e. currently common commercial lignite dust. However, during the method according to the invention e.g. also raw lignite of particle sizes up to 10 mm can be used, wherein the raw lignite is reduced in size in the dispersing circuit, especially in the dispersing device. This again broadens the range of applications of the method according to the invention. Too large lignite particles can optionally be reduced in size before feeding into the dispersing circuit, for example by grinding.

It is possible to employ lignites of different locations (origin) as the starting material. Moreover, it is possible to use lignite in a mixture with technical lignines of the pulp industry as well as wood hydrolysis, lignite in a mixture with lignin as well as lignocellulose material from the steam explosion digestion for the manufacture of fibers, and lignite in a mixture with lignocellulose material such as wood and bark particles. Said mixtures can be used in the method according to the invention as pre-blends or obtained by blending the individual components and the aqueous ammonia solution in the dispersing device.

The dispersing device used in step a) is a mixing device and a comminuting device at the same time, wherein the mixture of lignite particles and aqueous ammonia solution as well as optionally recovered product of step b) is blended in the dispersing device while simultaneously reducing the lignite particles in size until there is obtained a suspension of size-reduced lignite particles and aqueous ammonia solution. By reducing the lignite particles in size in the dispersing device it is possible to obtain lignite particles with a relatively uniform particle size distribution what makes it possible to form a particularly homogenous suspension that is fed to oxidation in step b).

Preferably, the lignite particles are reduced to a mean particle size of ≤10 µm, more preferably to mean particle sizes of <8 µm, still more preferably to mean particle sizes of <6 µm, and especially to mean particle sizes <4 µm in the dispersing device. Reducing the lignite particles is size is of advantage in that the reaction surfaces are significantly increased and the mean size distribution is relatively uniform what favors the oxidation reaction performed in step b).

In the context of the method according to the invention the mean particle size is the volume-average particle size. In the context of the present method this is determined by means of laser diffraction unless otherwise indicated or obvious to the skilled person. In laser diffraction, particle size distributions are established by measuring the angular dependence of the intensity of scattered light of a laser beam penetrating a dispersed sample. The particle size is given as the diameter of isovolumetric spheres. If for technical reasons it is not possible to determine the mean particle size by means of laser diffraction, the particle size is microscopically determined by determining the largest diameter and optionally averaging the obtained values.

Measuring the volume-average particle size in the context of the present invention can be done in accordance with the following method.

A sample of the lignite suspension (100 ml) is taken out of the circulation system, stirred for 15 min in a beaker on a magnetic stirrer, and subsequently treated for 10 s in ultrasound. Determination of the mean particle size in the thus treated sample by laser diffraction is done with a LS200 of Beckmann Coulter, for example.

The dispersing device that is employed in the method according to the invention contains at least one dispersing chamber and a liquid inlet to introduce an aqueous ammonia solution and optionally recovered product of step b) into the dispersing chamber. Moreover, it contains at least one substance inlet to introduce the lignite particles into the dispersing chamber. In addition, it contains at least one outlet to lead off the mixture of lignite particles and aqueous ammonia solution from the dispersing chamber.

Reducing the lignite particles in the dispersing device is preferably done by means of a rotor-stator gear rim system that can have different gap sizes, so that the degree of the size reduction can be determined by selecting the respective rotor-stator gear rim system. Such systems are known in the prior art and commercially available.

The dispersing device employed in the method according to the invention is preferably a closed system, so that a gas exchange with the environment is suppressed.

For example, the dispersing device can be one of the models of the MT-VP series. The devices of the MT-VP series are systems that are described in EP 1 674 151 A1 and EP 1 674 151 B1 to which explicitly reference is made. The devices of the MT-VP series enable throughputs of 1,000 L/hr to 70,000 L/hr. Here, the lignite particles are sucked into the dispersing chamber by means of low pressure, as described in detail in EP 1 674 151 B1, where they are blended with aqueous ammonia solution. The devices of the MT-VP series enable to suck 70 kg to 3,500 kg of lignite particles into the dispersing chamber per hour.

As an alternative to the devices of the MT-VP series e.g. also devices of the company YTRON can be used as the dispersing device, for example a device under designation YTRON-ZC.

In the dispersing chamber the liquid is suitably set in motion, so that the lignite particles and aqueous ammonia solution as well as optionally recovered product of step b) are thoroughly mixed while at the same time reducing the lignite particles in size. Here, the dispersing chamber is configured such that the flow conditions generally are turbulent and a fine-dispersion of the substance in the liquid is favored. In the course of the intensive thoroughly mixing the lignite particles are intensively wetted with the aqueous ammonia solution. In this way, especially when using lignite dust the risk of agglomeration is almost eliminated. Preferably, the outlet of the dispersing chamber is connected to the liquid inlet in a manner enabling to pass the liquid through the dispersing chamber several times. This recirculation makes it possible to successively concentrate the aqueous ammonia solution with lignite particles and/or to achieve a particularly homogenous distribution of the lignite particles in the aqueous ammonia solution.

Optionally, an oxidizing agent can already be added to the dispersing device, especially to the dispersing chamber of the dispersing device, and then directly to the liquid flow. For example, the oxidizing agent may be an oxygen($O_2$)-containing gas that is selected from oxygen, oxygen-enriched air, or air. Further, the oxidizing agent may be for example ozone or hydrogen peroxide, preferably aqueous hydrogen peroxide solution. It is preferred to add an oxygen ($O_2$)-containing gas, especially air.

The recirculation pump of the dispersing circuit pumps the mixture of lignite particles and aqueous ammonia solution through the dispersing circuit. As already mentioned above, the recirculation pump may already be part of the dispersing device. Thereby, the recirculation pump sucks off the suspension from the recirculation container and blows it into the dispersing device.

After having passed through the dispersing device the lignite suspension again enters the recirculation container. Therefrom the lignite suspension contained in the dispersing device is continuously withdrawn from the circulation and made available to step b). In order to prevent settling, the recirculation container is preferably equipped with further stirrers. These stirrers may be gassing agitators that enable the addition of gases, for example air, oxygen, or $CO_2$.

The intensive mixing of lignite particles and aqueous ammonia solution as well as optionally recovered product of step b) that takes place in step a) enables that in step a) e.g. up to 30 wt. % of lignite particles can be employed to 70 wt. % of the aqueous ammonia solution, each based on the total weight of the mixture of lignite particles and aqueous ammonia solution. Preferably, at least 10 wt. % of lignite particles are employed to 90 wt. % of the aqueous ammonia solution, more preferably at least 12 wt. % of lignite particles to 88 wt. % of the aqueous ammonia solution, even more preferably at least 14 wt. % of lignite particles to 86 wt. % of the aqueous ammonia solution, even more preferably at least 16 wt. % of lignite particles to 84 wt. % of the aqueous ammonia solution, even more preferably 18 wt. % of lignite particles to 82 wt. % of the aqueous ammonia solution, even more preferably 20 wt. % of lignite particles to 80 wt. % of the aqueous ammonia solution, even more preferably 25 wt. % of lignite particles to 75 wt. % of the aqueous ammonia solution, each based on the total weight of the mixture of lignite particles and aqueous ammonia solution.

The mean retention time of the mixture of lignite particles and aqueous ammonia solution as well as optionally recovered product of step b) in the dispersing device can be e.g. up to 6 hrs. In this way, lignite particles are intensively wetted and reduced in size. Preferably, the mean retention time of the mixture of lignite particles and aqueous ammonia solution as well as optionally recovered product of step b) in the dispersing device is 30 to 300 min, more preferably 45 to 240 min, especially preferred 60 to 180 min, before the resulting suspension is taken out of the dispersing circuit and supplied to step b). The mean retention time is calculated as common with the continuous process realization from the total volume of the dispersing device and added or withdrawn volumes (e.g. in case of a volume of the dispersing device of 100 L and a feed and withdrawal, respectively of 25 L/hr the mean retention time would be 4 hrs).

The lignite suspension obtained in step a) is generally supplied to step b) via the recirculation container of the dispersing circuit. In step b) the suspension that was obtained in step a) is laced with an oxygen-containing oxidizing agent in an oxidation reactor at a temperature of <100° C.

Preferably, the temperature at which the suspension obtained in step a) is oxidized in the oxidation reactor is at least 50° C., more preferably between 60 and 90° C., especially preferred between 70 and 80° C.

Preferably, the oxygen-containing oxidizing agent used in step b) is an oxygen($O_2$)containing gas selected from oxygen, oxygen-enriched air, or air. Alternatively, the oxygen-containing oxidizing agent may also be ozone or hydrogen peroxide. Preferably, the oxygen-containing oxidizing agent is directly introduced into the suspension, for example in case of a gaseous oxidizing agent by feeding the gas into the reaction mixture under excess pressure, as is described in detail in the following.

If a gas is used as the oxygen-containing oxidizing agent, i.e. for example oxygen, oxygen-enriched air, air, or ozone, so this is preferably directly fed into the suspension with an excess pressure of up to 0.8 MPa (8 bar) by means of a gas metering device. In the context of the present invention "excess pressure" means that the pressure with which the oxygen-containing oxidation gas is supplied is above standard pressure. Standard pressure corresponds to a pressure of 101,325 Pa=1.01325 bar. Accordingly, during the method according to the invention the oxygen-containing gas is supplied with a pressure of >0.101325 MPa (>1.01325 bar), wherein the oxygen-containing gas can be supplied with an excess pressure of up to 0.8 MPa (8 bar). Preferably, the oxygen-containing gas is supplied with an excess pressure of at least 0.15 MPa (1.5 bar). More preferably is an excess pressure of 0.2 to 0.8 MPa (2 to 8 bar), even more preferably 0.3 to 0.7 MPa (3 to 7 bar) and especially preferred 0.4 to 0.6 MPa (4 to 6 bar).

For example, the gas metering device may be a lance, a gassing ring, or a gassing agitator that are located in the reactor and in contact with the suspension or dipped into it, respectively. Preferably, the gas metering device is a gassing agitator with which the suspension can be stirred in the reactor at the same time what favors the feeding of the oxygen-containing oxidation gas into the suspension and thus, the oxidation reaction.

Alternatively, the oxygen-containing oxidizing agent can also be added in solution, for example in the form of an aqueous hydrogen peroxide solution. Further, gaseous oxidizing agents can be added in solution, preferably in an aqueous solution.

Generally, the oxidation reactor also runs under excess pressure that is slightly lower than the pressure with which the oxygen-containing gas is introduced (if such is introduced). Preferably, the oxidation reactor runs under a pressure greater than 0.101325 MPa (1.01325 bar) (standard pressure) up to 0.7 MPa (7 bar), more preferably up to 0.6 MPa (6 bar).

In addition, catalysts can be used during the oxidation step b) that increase the activity of the oxidizing agent.

Preferably, the oxidation in step b) takes place with an oxygen($O_2$)-containing gas selected from oxygen, oxygen-enriched air, or air. Especially preferred, the oxidation takes place with (compressed) air contributing to the economic efficiency of the method.

The mean retention time of the suspension in the oxidation reactor is preferably 15 to 300 min, more preferably 30 to 240 min, especially preferred 45 to 120 min. By the oxidation of the suspension obtained from step a) in this period with the oxygen-containing oxidizing agent there is formed a suspension comprising the oxidation product of the suspension obtained from step a). The suspension resulting from step b) in the context of the method according to the invention is referred to as "product suspension" containing the oxidation product.

Thoroughly mixing of the reaction mixture in the oxidation reactor is done by stirring the reaction mixture, for example by an already-mentioned gassing agitator, or other customary stirring facilities in the oxidation reactor. Stirring of the reaction mixture provides for a uniform progress of the oxidation reaction and prevents settling in the oxidation vessel.

Optionally, the oxidation reactor used in step b) can also be connected to a further dispersing circuit into which the lignite suspension can be introduced and recycled back from there into the oxidation reactor. Additional thoroughly mixing and size reduction of the lignite particles in the further dispersing circuit provides for an additional homogenization of the suspension what in turn affects and favors the oxidation reaction whereby in the end the nitrogen binding ratios in the product can be influenced. Said further dispersing circuit may be a dispersing circuit as described above with respect to step a) of the method according to the invention, so that it can be refrained from a further explanation.

Preferably, excessive gas (oxygen-containing oxidation gas and/or ammonia) is directly added to the suspension again. Also, excessive gas can be withdrawn from the reactor in a controlled manner and transferred to the gas purification or recovery of ammonia. The recovered ammonia can be used for producing the aqueous ammonia solution that is employed in step a). These measures contribute to the economic efficiency of the method according to the invention.

As already explained above, step b) is characterized in that a certain volume of the suspension from step a) is continuously fed into the reactor and a certain volume of a product suspension is continuously withdrawn from the reactor and either is transferred to drying in step c) or again is made available to step a). Since in this way non-oxidized material, i.e. non-oxidized suspension of lignite particles and aqueous ammonia solution, is continuously fed into the reactor, the oxidizing gas supply in the method according to the invention does not have to be stopped and the oxidation reaction can continuously be carried out without termination of the reaction.

In addition, the reactor can be equipped with one or more stirring devices that further thoroughly mix the suspension of lignite particles and aqueous ammonia solution during gassing what favors the progress of the oxidation reaction and prevents settling.

The oxidized product suspension is continuously withdrawn from the reactor e.g. via a receiving vessel. The receiving vessel is under standard pressure. To prevent settling, the recirculation container is preferably equipped with further stirrers. These stirrers may also be gassing agitators enabling the addition of further gases, for example $CO_2$.

The product suspension obtained from step b) can completely be fed to step c). Alternatively, the product suspension also can partially be fed again to step a), where it is mixed with the starting materials lignite particles and aqueous ammonia solution, and partially to step c). In a preferred embodiment the product suspension withdrawn from step b) is completely fed to step c). Partially recycling the product suspension to step a) is not preferred.

Step c) is a drying step. Drying is carried out at a temperature of >50° C., preferably >60° C., especially preferred >70° C., wherein the maximum temperature is preferably 120° C.

The mean retention time for drying is generally below 20 hours, preferably below 10 hours, more preferably below 8 hours.

Drying can be performed under standard pressure or reduced pressure, wherein drying is preferably performed under standard pressure. Of course, also multi-stage drying at different pressures in different stages is possible.

During drying there is formed a product that has a residual moisture content of at most 30 wt. %, based on the total weight of the dried product. Preferably, the dried product has a residual moisture content of 25 wt. %, based on the total weight of the dried product, and especially preferred is a residual moisture content of at most 20 wt. %, based on the total weight of the dried product.

The exhaust steam of ammonia and water vapor that is formed during drying is preferably purified by means of distillation, wherein purified water and ammonia are obtained that can be used for producing an aqueous ammonia solution that can be fed again to the method, especially to step a). This contributes to the economic efficiency of the method.

By adjusting the duration of drying and the drying temperature during drying the product characteristics can be modified in view of the nitrogen binding ratios.

In a preferred embodiment drying of the product suspension is performed in a combined fluid dryer. By adjusting the revolutions of the combined fluid dryer the product characteristics can further be modified in view of the nitrogen binding ratios.

Moreover, it is possible to selectively dope the product suspension with macro- and micronutrients, bacteria, fungi, and water reservoirs based on minerals or synthetics, such as for example bentonite, during the drying operation in step c) and/or in step d) and thus, influence the product characteristics.

Macro- and micronutrients with respect to plant nutrients are well-known technical terms and described in detail e.g. in Fiedler, H J and Reissig, H: "Lehrbuch der Bodenkunde", Gustav Fischer Verlag Jena, 1964, p. 234 under "Pflanzennährstoffe des Bodens". Thus, macronutrients, also referred to as macroelements or major elements, are nutrients involved in the structure of the corporeal substance of the plants and form the largest mass fraction. Nitrogen (N), phosphorus (P), and potassium (K), inter alia rank among the macronutrients. In the present case, micronutrients, also referred to as microelements or trace elements, are meant to be chemical elements that are essential in view of vegetal nutrition and metabolism, but in contrast to macronutrients are only needed in small amounts, such as for example iron (Fe), manganese (Mn), or boron (B).

Optionally, also an agglomerating agent can be added in the drying step c). The agglomerating agent ensures that the product agglomerates during drying and a fine, dust-free product is formed. Such a product is particularly suitable for use as a fertilizer.

In the last step of the method according to the invention, i.e. in step d), the product obtained in step c) is cooled. Preferably, cooling of the product in step d) is performed in a rotary drum. This, for example has a diameter in the range of 0.5 to 1.5 m and a length of 2 to 5 m and rotates with a speed of up to 20 rpm.

Optionally, also during cooling in step d) an agglomerating agent can be added that further affects the product characteristics in view of grain size. This way, also the mechanical stability of the product can be enhanced. Preferably, an agglomerating agent is added in step c) and additionally also in step d).

Preferably, the dried product is cooled to a temperature below 50° C., particularly preferred to room temperature (20 to 30° C.). Duration of cooling is usually 10 to 240 min, preferably 20 to 180 min, particularly preferred 30 to 120 min.

The mean retention time in the system (in which process steps a) to d) are carried out) can be controlled variably. Starting from mixing the starting products lignite and aqueous ammonia solution in step a) until obtaining the dried and cooled product in step d) the mean retention time usually is 90 min to 30 hrs, preferably 2 to 24 hrs, particularly preferred 3 to 12 hrs.

Moreover, the mean retention time can be controlled variably in each step what makes it possible to selectively influence the product characteristics in view of the total nitrogen content, nitrogen binding ratios, and doping.

In addition, it is possible to feed further gases, for example $CO_2$ to affect the nitrogen binding ratios in the product in each step of the method according to the invention.

All in all, thus the method according to the invention enables to selectively control the process steps with respect to the throughput of the starting materials and energy demand and thus, to selectively control the product characteristics.

The products prepared with the method according to the invention (organic fertilizer with humic substance properties) have a nitrogen content of up to 8 wt. %, based on the dry weight of the fertilizer, and a C/N ratio of 7 to 15, preferably 8 to 15, more preferably 9 to 15. Preferably, the nitrogen content of the products prepared with the method according to the invention is at least 4 wt. %, more preferably at least 5 wt. %, and particularly preferred at least 6 wt. %, each based on the dry weight of the fertilizer.

The nitrogen is present in the product in various chemical binding forms. Part of the nitrogen is present in the ammonium form, which is immediately plant-available (10 to 41 wt. %, based on the total content of nitrogen of the product). A further part is present bonded in stably organically bonded binding forms that have a long-term plant-availability (4 to 73 wt. %, based on the total content of nitrogen of the product). A further part is present in the amide form, which is medium-term plant-available (14 to 21 wt. %, based on the total content of nitrogen of the product).

The chemical binding forms differ in terms of their hydrolysability. The nitrogen bonded in the ammonium form can easily be cleaved off as ammonia with MgO suspended in water, while the organic binding forms are more difficult to hydrolyze. The part present in the amide form can ordinarily be hydrolyzed with diluted sodium hydroxide solution under the conditions of steam distillation. The proportion that cannot be hydrolyzed under said experimental conditions represents the stable, organically bonded nitrogen.

EXAMPLE 100 kg/hr of lignite dust are continuously withdrawn from a receiving vessel and fed into a dispersing device (Modell Ytron ZC) that is part of a circulation system that is additionally consisting of a recirculation container as well as a recirculation pump.

An aqueous 5% ammonia solution is continuously charged into the circulation system via the recirculation container, so that a mixture of 20 wt. % of lignite dust and 80 wt. % of ammonia solution, based on the total weight of the mixture, is formed. The mixture is pumped through the circulation system for a mean retention time of 180 min, wherein an intensive thoroughly mixing and size reduction of the lignite particles takes place.

The resulting lignite suspension is continuously withdrawn from the recirculation container and fed to the oxidation reactor.

The oxidation reactor is composed of a vessel with a usable volume of 2.5 m³ and further comprises a gassing agitator. In this arrangement the lignite suspension is gassed with pressurized air for a mean retention time of 120 min at 0.3 MPa (3 bar) and a temperature of 70° C. while stirring. The oxidized product suspension is continuously withdrawn via a receiving vessel, wherein the receiving vessel is under standard pressure.

The product suspension is continuously fed from the receiving vessel into a combined fluid dryer and dried at a mean temperature of 100° C. over a mean retention time of 10 hrs to a residual moisture of 25 wt. %, based on the total weight of the dried product. The mean retention time results from the volume of the dryer (3000 L) and the withdrawal quantity of the dried product (300 L/hr). The thus formed exhaust steam is purified by means of washing and distillation. The resulting aqueous ammonia solution is recycled into the process. An agglomeration agent is added to the product during drying to generate an agglomerate.

After drying, the agglomerated product is cooled in a slowly running drum and thereby can further be agglomerated as needed by adding further agglomerating agent. Then, the product temperature is at room temperature (20 to 30° C.).

Nitrogen yield of the thus obtained product was analytically determined.

Elemental Analysis:
C: 58.8%,
H: 5.1%,
N: 5.5%,
S: 0.7%.

Binding forms of the nitrogen (in wt. %, based on the total nitrogen content):
ammonium-N: 32.7 wt. %, organically bonded: 54.5 wt. %, amide-N: 12.7 wt. %.

The invention claimed is:

1. A method for producing an organic fertilizer with humic substance properties by oxidizing and ammonifying lignite, wherein the organic fertilizer has a nitrogen content of up to 8 wt. %, based on the dry weight of the fertilizer, and a C/N ratio of 7 to 15,
wherein
the method is carried out as a continuous method and comprises the following steps:
   a) feeding lignite particles, an aqueous ammonia solution, and optionally recovered product of step b) as starting materials into a dispersing circuit comprising a dispersing device, a recirculation container, and a recirculation pump; dispersing the starting materials while simultaneously reducing the lignite particles in size until a suspension of lignite particles and aqueous ammonia solution is formed, wherein the recirculation pump moves the suspension from the recirculation container to the dispersing device; and taking the suspension out of the dispersing circuit and continuously transferring it to step b);
   b) continuously oxidizing the suspension obtained in step a) in an oxidation reactor with an oxygen-containing oxidizing agent at a temperature of <100° C., thereby forming a product suspension; continuously withdrawing the product suspension from the oxidation reactor; and transferring the product suspension completely to step c), or partially to step c) and partially to step a) as the starting material;
   c) drying the product suspension obtained in step b) at a temperature of >50° C. up to a residual moisture content of at most 30 wt. %, based on the total weight of the dried product, and forming an exhaust steam of ammonia and water vapor; and
   d) cooling the dried product obtained in step c).

2. The method according to claim 1, wherein in step a) lignite particles with particle sizes >10 μm are employed, which are reduced in size in the dispersing device to particle sizes of 0 μm.

3. The method according to claim 1, wherein the concentration of the aqueous ammonia solution used in step a) is up to 10 wt. %, based on the total weight of the aqueous ammonia solution.

4. The method according to claim 1, wherein in step a) up to 30 wt. % of lignite particles and at least 70 wt. % of the aqueous ammonia solution are employed, each based on the total weight of the mixture of lignite particles and aqueous ammonia solution.

5. The method according to claim 1, wherein the mean retention time of the mixture of lignite particles and aqueous ammonia solution in the dispersing device of step a) is 30 to 300 min.

6. The method according to claim 1, wherein in step a) additionally an oxygen-containing oxidizing agent is fed to the suspension of lignite particles and aqueous ammonia solution that is selected from oxygen, oxygen-enriched air, air, ozone, or hydrogen peroxide.

7. The method according to claim 1, wherein the oxygen-containing oxidizing agent used in step b) is an oxygen($O_2$)-containing gas that is selected from oxygen, oxygen-enriched air or air or ozone or hydrogen peroxide.

8. The method according to claim 7, wherein the oxygen-containing oxidizing agent used in step b) is an oxygen($O_2$)-containing gas or ozone that is fed to the suspension at an excess pressure of up to 0.8 MPa by means of a gas metering device.

9. The method according to claim 1, wherein the mean retention time of the suspension obtained in step a) in the oxidation reactor is 15 to 300 min.

10. The method according to claim 1, wherein the oxidation reactor is connected to a further dispersing device.

11. The method according to claim 1, wherein the product suspension obtained in step b) is completely fed to step c).

12. The method according to claim 1, wherein the exhaust steam of ammonia and water vapor formed in step c) is purified by means of distillation.

13. The method according to claim 1, wherein an agglomerating agent is added in step c) and/or in step d).

14. The method according to claim 1, wherein the product suspension is doped with macro- and micronutrients, bacteria, fungi, or water reservoirs during drying in step c) and/or in step d).

15. The method according to claim 1, wherein drying of the product suspension in step c) is performed in a combined fluid dryer and/or cooling of the dried product in step d) is performed in rotary drum.

16. An organic fertilizer with humic substance properties having a nitrogen content of up to 8 wt. %, based on the dry weight of the fertilizer, and a C/N ratio of 7 to 15 obtained by the method according to claim 1.

17. The method according to claim 1, wherein the oxidation reactor runs at an excess pressure of up to 0.7 MPa.

18. The method according to claim 1, wherein the dispersing device comprises (A) a dispersing chamber, (B) a liquid inlet for introducing the aqueous ammonia solution and optionally recovered product of step b) into the dispersing chamber, and (C) an outlet for withdrawing the suspension of lignite particles and aqueous ammonia solution from the dispersing chamber, and wherein the outlet is connected to the liquid inlet for passing the liquid through the dispersing chamber multiple times.

* * * * *